United States Patent
Kim et al.

(10) Patent No.: US 9,042,080 B2
(45) Date of Patent: May 26, 2015

(54) MULTILAYER CERAMIC ELECTRONIC COMPONENT AND METHOD OF MANUFACTURING THE SAME

(71) Applicant: SAMSUNG ELECTRO-MECHANICS CO., LTD., Suwon, Gyunggi-do (KR)

(72) Inventors: Hyo Jung Kim, Gyunggi-do (KR); Seok Hyun Yoon, Gyunggi-do (KR); Chang Hoon Kim, Gyunggi-do (KR); Byoung Hwa Lee, Gyunggi-do (KR); Sang Hoon Kwon, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 81 days.

(21) Appl. No.: 13/727,420

(22) Filed: Dec. 26, 2012

(65) Prior Publication Data

US 2013/0194715 A1   Aug. 1, 2013

(30) Foreign Application Priority Data

Jan. 31, 2012   (KR) .................. 10-2012-0009539

(51) Int. Cl.
| | |
|---|---|
| *H01G 4/06* | (2006.01) |
| *H01G 4/30* | (2006.01) |
| *H01G 4/12* | (2006.01) |
| *H01G 13/00* | (2013.01) |
| *H01G 4/008* | (2006.01) |

(52) U.S. Cl.
CPC .............. *H01G 4/30* (2013.01); *H01G 4/008* (2013.01); *H01G 4/1218* (2013.01); *H01G 13/003* (2013.01); *H01G 4/12* (2013.01)

(58) Field of Classification Search
USPC ............... 361/321.2, 301.2, 301.4, 303–305, 361/306.1, 306.3, 311–313, 321.1
See application file for complete search history.

(56) References Cited

U.S. PATENT DOCUMENTS

| | | | |
|---|---|---|---|
| 7,190,566 B2 * | 3/2007 | Tonogai et al. ............... | 361/303 |
| 7,206,187 B2 * | 4/2007 | Satou ............................ | 361/309 |
| 7,589,954 B2 * | 9/2009 | Kusano et al. ............. | 361/321.4 |
| 7,715,171 B2 * | 5/2010 | Nakano et al. ............... | 361/303 |

(Continued)

FOREIGN PATENT DOCUMENTS

| | | |
|---|---|---|
| JP | 05-243081 A | 9/1993 |
| JP | 2007-266034 A | 10/2007 |

(Continued)

OTHER PUBLICATIONS

Japanese Office Action issued in Japanese Application No. 2012-244499 dated Jun. 10, 2014, w/English translation.

(Continued)

*Primary Examiner* — Nguyen T Ha
(74) *Attorney, Agent, or Firm* — McDermott Will & Emery LLP (57) ABSTRACT

There are provided a multilayer ceramic electronic component and a method of manufacturing the same. Here, an average diameter ($D_c$) of ceramic grains in a cover area is smaller than an average diameter ($D_a$) of ceramic grains in the active area, and when a thickness of the cover area is expressed by Tc, 9 um≤Tc≤25 um and Tc/Dc≥55 are satisfied. A multilayer ceramic capacitor having excellent moisture-resistance properties may be obtained.

23 Claims, 2 Drawing Sheets

(56) References Cited

U.S. PATENT DOCUMENTS

| | | |
|---|---|---|
| 8,154,848 B2 * | 4/2012 | Motoki et al. ............. 361/306.1 |
| 8,498,096 B2 * | 7/2013 | Kobayashi ................ 361/306.3 |
| 8,537,521 B2 * | 9/2013 | Ando et al. ............... 361/301.4 |
| 2011/0141655 A1 | 6/2011 | Jeong et al. |

FOREIGN PATENT DOCUMENTS

| | | |
|---|---|---|
| JP | 2007-266223 A | 10/2007 |
| JP | 2009-286648 A | 12/2009 |
| KR | 2011-0065623 A | 6/2011 |

OTHER PUBLICATIONS

Japanese Office Action issued in Japanese Application No. 2012-244499 mailed Nov. 18, 2014, with English translation.

Korean Office Action issued in Korean Application No. 10-2012-0009539 dated Oct. 16, 2014, with English translation.

* cited by examiner

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0009539 filed on Jan. 31, 2012, in the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same.

2. Description of the Related Art

Recently, with the demand for small-sized and multi-functional products, such as electronic products, IT and A/V products, or the like, electronic components have also needed to become small and have multi-functionality, and, in accordance with these requirements, the demand for multilayer ceramic electronic components is increasing. Multilayer ceramic electronic components have been widely used as components in computers, mobile phones, and the like, due to advantages thereof, such as miniaturization, high capacity, and ease of mounting, and the like.

A capacitor, an inductor, a varistor, and the like are provided as multilayer ceramic electronic components. Also, in general, multilayer ceramic capacitors, passive devices in general widely used, are also required to have high-capacity and high-reliability.

For small-sized, high-capacity multilayer ceramic capacitors, ceramic sheets and internal electrodes are required to be thinned and highly laminated; however, as these elements become thinner and more highly laminated, a volume of the internal electrodes may be increased while a thickness of a cover layer may be decreased.

The decrease in the thickness of the cover layer may allow moisture and the like to infiltrate into the multilayer ceramic capacitor from the outside, and thus, the moisture-resistance properties of the multilayer ceramic capacitor may be degraded.

SUMMARY OF THE INVENTION

An aspect of the present invention provides a multilayer ceramic component having excellent moisture-resistance properties and a method of manufacturing the same.

According to an aspect of the present invention, there is provided a multilayer ceramic electronic component, including: a ceramic body; external electrodes formed on outer surfaces of the ceramic body; and internal electrodes laminated with ceramic layers each interposed therebetween in the ceramic body, wherein the ceramic body includes an active area from an uppermost internal electrode to a lowermost internal electrode and a cover area formed above or below the active area, an average diameter ($D_c$) of ceramic grains in the cover area formed above or below the active area is smaller than an average diameter ($D_a$) of ceramic grains in the active area, and when a thickness of the cover area is expressed by $T_c$, 9 um$\leq T_c \leq$25 um and $T_c/D_c \geq$55 are satisfied.

The average diameter ($D_c$) of ceramic grains in the cover area may be an average diameter of ceramic grains in the cover area in a thickness direction of the ceramic body.

$1.1 \leq D_a/D_c \leq 4.4$ may be satisfied.

The ceramic body may include a dielectric material, and the dielectric material may include barium titanate or strontium titanate.

The number of the internal electrodes laminated in the ceramic body may be 250 or greater.

The internal electrodes may include at least one selected from a group consisting of nickel, palladium, and an alloy thereof.

The external electrodes may include at least one selected from a group consisting of nickel, nickel alloys, and palladium.

According to another aspect of the present invention, there is provided a multilayer ceramic electronic component, including: a ceramic body including an internal electrode lamination part having a plurality of internal electrodes laminated therein; and external electrodes formed on outer surfaces of the ceramic body, wherein a thickness ($T_c$) of an outer area outside the internal electrode lamination part of the ceramic body is 9~25 μm, an average diameter ($D_c$) of ceramic grains in the outer area is smaller than an average diameter ($D_a$) of ceramic grains in the internal electrode lamination part of the ceramic body, and $T_c/D_c \geq$55 is satisfied.

In the internal electrode lamination part, adjacent internal electrodes among the plurality of internal electrodes may be withdrawn in opposing directions.

The outer area may be disposed in a lamination direction of the internal electrodes in the internal electrode lamination part.

The average diameter ($D_c$) of ceramic grains in the outer area may be an average diameter of the ceramic grains in the outer area in a thickness direction of the ceramic body.

$1.1 \leq D_a/D_c \leq 4.4$ may be satisfied.

The ceramic body may include a dielectric material, and the dielectric material may include barium titanate or strontium titanate.

The number of the internal electrodes laminated in the ceramic body may be 250 or greater.

The internal electrodes may include at least one selected from the group consisting of nickel, palladium, and an alloy thereof.

The external electrodes may include at least one selected from the group consisting of nickel, nickel alloys, and palladium.

According to another aspect of the present invention, there is provided a method of manufacturing a multilayer ceramic electronic component, the method including: preparing a first ceramic powder and a second ceramic powder, an average grain size of the second ceramic powder being 1.1~1.4 times an average grain size of the first ceramic powder; preparing first ceramic green sheets and second ceramic green sheets by using the first ceramic powder and the second ceramic powder, respectively; forming internal electrodes on each of the second ceramic green sheets; laminating the first ceramic green sheets to form an upper cover and a lower cover each having a thickness of 11~28 μm; laminating the desired number of the second ceramic green sheets each having the internal electrodes laminated thereon, to thereby form a second ceramic green sheet laminate; and laminating the lower cover, the second ceramic green sheet laminate, and the upper cover.

In the preparing of the first ceramic powder and the second ceramic powder, the first ceramic powder and the second ceramic powder each may include a barium titanate powder.

In the forming of the internal electrodes, the internal electrodes may be formed through printing of a conductive paste.

The conductive paste may include a conductive metal, and the conductive metal may include at least one selected from a group consisting of nickel, palladium, and an alloy thereof.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Embodiments of the present invention will now be described in detail with reference to the accompanying drawings.

The invention may be embodied in many different forms and should not be construed as being limited to the embodiments set forth herein.

The embodiments of the present invention are provided so that those skilled in the art may more completely understand the present invention.

In the drawings, shapes and dimensions may be exaggerated for clarity, and the same reference numerals will be used throughout to designate the same or like components.

Figure 1:
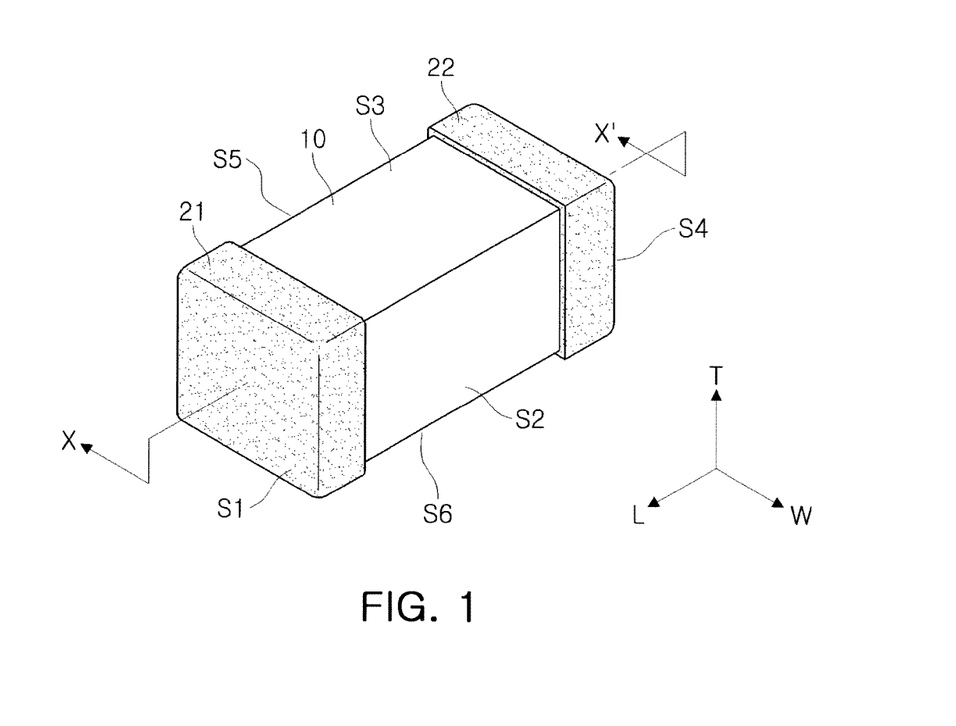
FIG. 1 is a perspective view of a multilayer ceramic electronic component according to an embodiment of the present invention.
Figure 2:
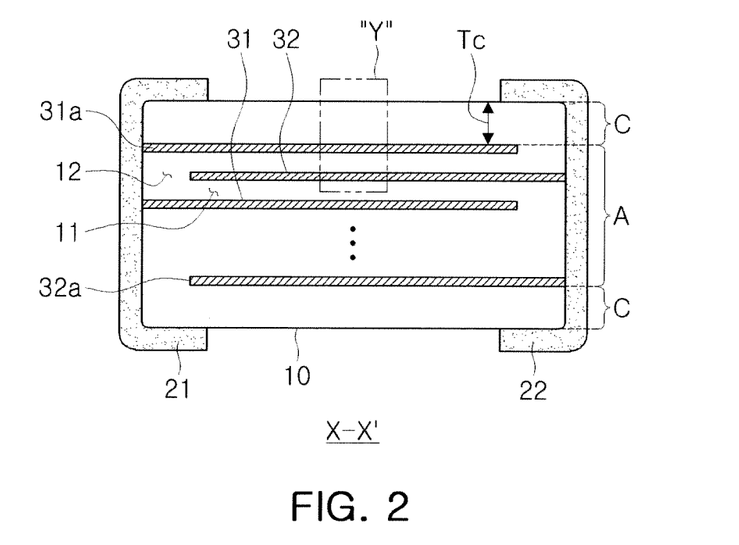
FIG. 2 is a cross-sectional view taken along line X-X' of FIG. 1.
Figure 3:
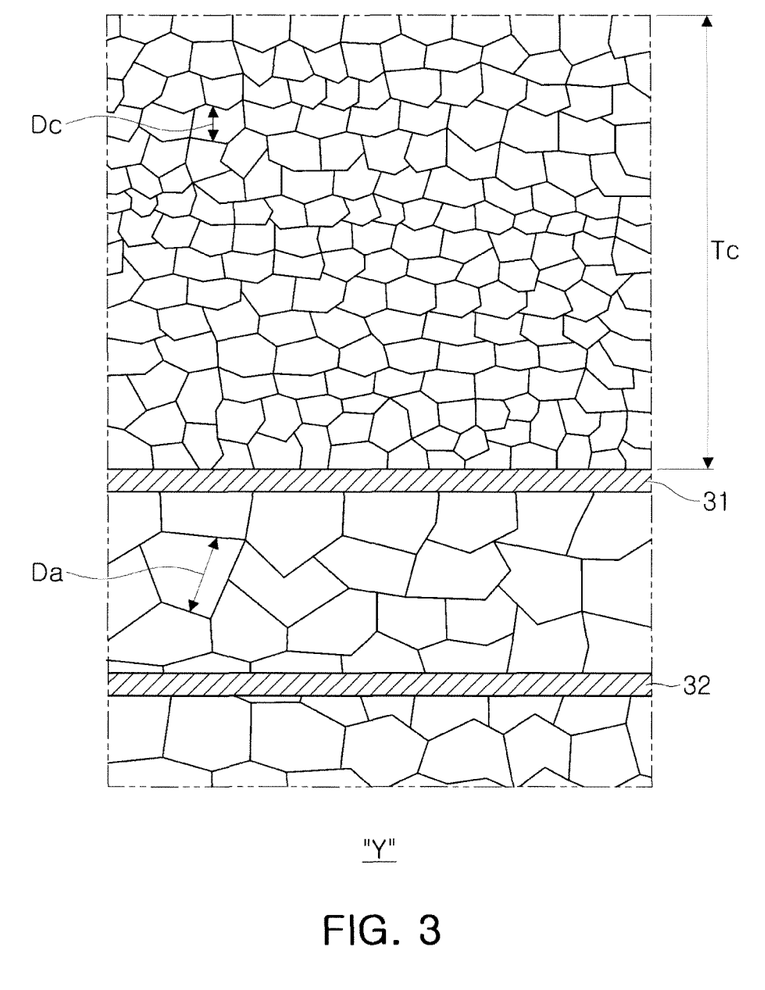
FIG. 3 is an enlarged view of part Y of FIG. 2.

FIG. 1 is a perspective view of a multilayer ceramic electronic component according to an embodiment of the present invention. FIG. 2 is a cross-sectional view taken along line X-X' of FIG. 1. FIG. 3 is an enlarged view of part Y of FIG. 2.

Referring to FIG. 1, a multilayer ceramic electronic component according to an embodiment of the present invention may include a ceramic body 10, external electrodes 21 and 22 formed on outer surfaces of the ceramic body 10, and internal electrodes laminated within the ceramic body 10.

The ceramic body 10 may have a rectangular parallelepiped shape, and here direction L may be defined as a "length direction", direction W as a "width direction", and direction T as a "thickness direction. The ceramic body 10 may have both end surfaces S1 and S4 in the length direction, both side surfaces S2 and S5 in the width direction, and top and bottom surfaces S3 and S6 in the thickness direction.

The ceramic body 10 may be formed of a ceramic material. The ceramic material may be a dielectric material having a high dielectric constant, and specifically, examples thereof may include barium titanate, strontium titanate, and the like.

The external electrodes 21 and 22 may be formed on both end surfaces S1 and S4 to oppose each other. The external electrodes 21 and 22 may be extended to portions of adjacent surfaces S2, S3, S5, and S6, such that a bonding strength of the external electrodes to the ceramic body can be improved.

A plating layer may be formed on the external electrodes for ease of mounting. The external electrodes 21 and 22 may be formed of a conductive metal, but are not limited thereto. The external electrodes 21 and 22 may be formed of copper, copper alloys, nickel, nickel alloys, silver, palladium, or the like. The external electrodes may include glass in order to prevent infiltration of a plating liquid and the like.

The external electrodes 21 and 22 may be formed on the end surfaces S1 and S4 in the length direction of the ceramic body. Here, the external electrodes 21 and 22 may be electrically connected to internal electrodes 31 and 32 exposed to surfaces of the ceramic body 10.

The internal electrodes 31 and 32 may be laminated with ceramic layers 11 each interposed therebetween within the ceramic body 10. The internal electrodes 31 and 32 may include a conductive metal such as nickel or the like, and low-temperature firing may be performed thereupon. Examples of the conductive metal may include at least one selected from the group consisting of gold, silver, copper, nickel, platinum, palladium, and an alloy thereof.

In addition, a ceramic sintering inhibitor having a high sintering temperature, such as barium titanate or the like, may be added to the internal electrodes, to thereby increase the sintering initiation temperature. Since the sintering temperature of the internal electrodes is lower than that of the ceramic material, the internal electrodes may be more quickly sintered than the ceramic material. Due to this, coverage of the internal electrodes may be reduced, and thus, capacitance implementation may be difficult. Therefore, the ceramic sintering inhibitor is added in order to suppress the reduction in coverage of the internal electrodes, as described above.

The number of laminated internal electrodes may be 250 or greater. With the tendency for high capacitance electronic components, the number of laminated internal electrodes is increasing. If the number of laminated internal electrodes is below 250, implementation of high capacitance may be difficult. In addition, thicknesses of the internal electrodes may be smaller in order to implement high capacitance.

Referring to FIG. 2, the ceramic body 10 may be divided into an active area A and cover areas C in the thickness direction. The cover areas C may border upper and lower portions of the active area A.

The active area A is referred to as an area in which the internal electrodes are laminated, and it may mean an area from an uppermost inner electrode 31a to a lowermost internal electrode 32a. The active area A may contribute to capacitance implementation.

The cover areas C may mean an area from the uppermost internal electrode 31a to the top surface S3 of the ceramic body or from the lowermost internal electrode 32a to the bottom surface S6 of the ceramic body. The cover areas C do not contribute to capacitance implementation.

The cover areas C may be formed above and below the active area A, which may be referred to as an upper cover area and a lower cover area, respectively. The upper cover area and the lower cover area may be symmetrical with regard to each other. A thickness ($T_c$) of each cover area C may be decreased according to the tendency for high capacitance.

In the embodiment, the thickness ($T_c$) of the cover area C may be 9~25 μm after sintering.

The thickness ($T_c$) of the cover area C may be gradually decreased due to the tendency of high capacitance. However, the present invention is to prevent degradation in moisture-resistance properties and secure reliability by regulating grain sizes in the cover area C and the active area A when the thickness ($T_c$) of the cover area C is below 25 μm.

However, if the thickness ($T_c$) of the cover area C is below 9 μm, the cover area C is extremely thin, and thus, moisture-resistance properties may be degraded therein, regardless of the grain sizes in the cover area C and the active area A.

In the embodiment, an average diameter ($D_c$) of ceramic grains in the cover area C may be smaller than an average diameter ($D_a$) of ceramic grains in the active area A.

The reason that the diameter ($D_c$) of ceramic grains in the cover area C is made to be smaller than the diameter ($D_a$) of ceramic grains in the active area A is as follows.

As ceramic powder has a greater surface area, sintering may occur at a lower temperature. The reason for this is that a surface area of the ceramic powder is larger and thus, a surface energy thereof is higher, resulting in unstable energy state overall. Accordingly, surface energy may be lowered to create a more stable state, and this may act as a driving force for sintering.

In the case in which the active area A and the cover area C have the same size of ceramic powder, the internal electrodes 31 and 32 of the active area A, the ceramic layers 11 and margin portions 12 of the active area A, and the cover area C may be sequentially sintered in this order. The above sintering sequence is merely determined conceptually rather than absolutely, and in actuality, respective sintering processes may overlap.

The internal electrodes may be sintered first, as the conductive metal used in the internal electrodes has a lower sintering temperature than that of the ceramic powder.

Then, the ceramic layers 11 and margin portions 12 of the active area A may be sintered. This is because compression stress may be applied to the ceramic layers between the internal electrodes due to shrinkage of the internal electrodes during the sintering procedure thereof, and this may act as a driving force for sintering.

Lastly, the cover areas C may be sintered.

Since the sintering temperature is different depending on the regions of the ceramic body as above, stress may be not uniformly distributed inside the ceramic body, and this may directly cause defects such as delamination, cracking, and the like.

Also, through subsequent processes, this may act as a latent risk factor that may generate defects by external impacts (thermal impact) or the like. In the case of ultrahigh-capacitance products, a ratio of thickness of the cover area C to the volume fraction of the internal electrodes is decreased, and the above problem may be magnified.

A grain size of the ceramic powder in the cover area C is decreased to lower the sintering temperature of the cover area C, and thus, a difference in sintering temperature between the cover area C and the active area A may be reduced, so that non-uniform stress distribution in the ceramic body may be decreased.

As a result, the grain size of the ceramic powder in the cover area C is smaller than that in the active area A, and thus, delamination and cracking may be suppressed. Therefore, a latent risk factor that may generate the defects may be decreased even under thermal impacts later, thereby improving moisture-resistance properties.

Specifically, the average diameter ($D_a$) of grains in the active area A with respect to the average diameter ($D_c$) of grains in the cover area C ($D_a/D_c$) may be 1.1~4.4.

If $D_a/D_c$ is below 1.1, the grain size of ceramic powder in the active area A is similar to the grain size of ceramic powder in the cover area C. Therefore, since the stress distribution between the active area A and the cover area C may be still non-uniform, delamination and cracking may occur and improvements in moisture-resistance properties may be inadequate.

If $D_a/D_c$ is above 4.4, the grain size of ceramic powder in the active area is significantly larger than the grain size of ceramic powder in the cover area C, and thus, stress non-uniformity between the cover area and the active area may be further degraded. The reason is that the cover area C may be more quickly sintered than the active area A.

The average diameters ($D_c$, $D_a$) of the grains may be measured by analyzing photographs showing cross-sections of the cover area C and the active area A, extracted by a scanning electron microscope (SEM). For example, the average diameters ($D_c$, $D_a$) of ceramic grains may be measured by using grain size measurement software supporting an average grain size standard measurement method defined by the American Society for Testing and Materials (ASTM) E112.

Regions including 30 grains or more are sampled in each of the cover area C and the active area A, and the above method may be used to measure the average diameters of the grains. Specifically, the sampling may be performed from an image obtained by scanning a length-thickness cross-section (L-T cross-section) of a central part among three equal parts of the ceramic body 10 in the width direction (W direction) through the scanning electron microscope (SEM).

The thickness ($T_c$) of the cover area C with respect to the average diameter ($D_c$) of the grains in cover area C in the thickness direction may be 55 or greater ($T_c/D_c \geq 55$). That is to say, the number of the grains arranged in the cover area C in the thickness direction may be 55 or more.

The average diameter ($D_c$) of the grains in the cover area C in the thickness direction may be defined by dividing a value obtained by adding up diameters of the grains measured in the cover area C in the thickness direction by the number of grains. Specifically, the measurement may be conducted at ten respective sections obtained by dividing a central part among three equal parts in the length direction into equal intervals, on the image obtained by scanning a length-thickness cross-section (L-T cross-section) of a central part among three equal parts of the ceramic body 10 in the width direction (W direction) using the scanning electron microscope (SEM).

The thickness ($T_c$) of the cover area C may be average. Specifically, the thickness ($T_c$) of the cover area C may be an average value of thicknesses in the cover area C, measured at ten respective sections obtained by dividing a central part among three equal parts in the length direction into equal intervals, on the image obtained by scanning a length-thickness cross-section (L-T cross-section) of a central part among three equal parts of the ceramic body 10 in the width direction (W direction) using the scanning electron microscope (SEM).

The number of grains in the cover area C in the thickness direction may be defined by a value ($T_c/D_c$) obtained through dividing the thickness ($T_c$) of the cover area C by the average diameter ($D_c$) of the grains in the cover area C in the thickness direction.

As the number of grains in the cover area C in the thickness direction increases, moisture-resistance properties may be excellent. The infiltration of moisture into the ceramic body from the outside may not occur through a grain inside, but through a grain boundary. This is because that the infiltration route may be longer as the number of grains is increased.

According to another embodiment of the present embodiment, a multilayer ceramic electronic component may include a ceramic body 10 including an internal electrode lamination part A having a plurality of internal electrodes laminated therein; and external electrodes 21 and 22 formed on outer surfaces of the ceramic body 10, wherein a thickness ($T_c$) of each of outer areas C outside the internal electrode lamination part A may be 9~25 μm, an average diameter ($D_c$) of ceramic grains in each of the outer areas C outside the internal electrode lamination part A may be smaller than an average thickness ($D_a$) of ceramic grains in the internal electrode lamination part A, and $T_c/D_c \geq 55$ may be satisfied.

The ceramic body 10 may be divided into the internal electrode lamination part A and the outer areas C formed above and below the ceramic body 10 in the thickness direction. The internal electrode lamination part A may refer to an area in which the internal electrodes 31 and 32 are laminated, within the ceramic body 10. The adjacent internal electrodes 31 and 32 in the internal electrode lamination part A may be withdrawn in opposing directions, and electricity having opposing polarities may be applied thereto, respectively.

The outer areas C may be formed above and below the internal electrode lamination part A. That is to say, the outer areas C may be disposed in a lamination direction of the internal electrodes in the internal electrode lamination part A.

The average diameter ($D_c$) of ceramic grains in each of the outer areas C may be an average diameter of ceramic grains present in each of the outer areas C in the lamination direction.

$1.1 \leq D_a/D_c \leq 4.4$ may be satisfied.

The ceramic body may contain a dielectric material.

Examples of the dielectric material may include barium titanate or strontium titanate.

The number of laminated internal electrodes may be 250 or greater.

The internal electrodes may include at least one selected from the group consisting of nickel, palladium, and an alloy thereof.

The external electrodes may include at least one selected from the group consisting of nickel, nickel alloys, and palladium.

Other details of the ceramic body, the internal electrodes, the external electrodes, and the like are the same as described above.

According to another embodiment of the present invention, a method of manufacturing a multilayer ceramic electronic component, may include: preparing a first ceramic powder and a second ceramic powder, an average grain size of the second ceramic powder being 1.1~1.4 times an average grain size of the first ceramic powder; preparing first ceramic green sheets and second ceramic green sheets by using the first ceramic powder and the second ceramic powder, respectively; forming internal electrodes on each of the second ceramic green sheets; laminating the first ceramic green sheets to form an upper cover and a lower cover each having a thickness of 11~28 μm; laminating the desired number of the second ceramic green sheets each having the internal electrodes laminated thereon, to thereby form a second ceramic green sheet laminate; and laminating the lower cover, the second ceramic green sheet laminate, and the upper cover.

The grain size of the first ceramic powder may be smaller than the grain size of the second ceramic powder. Specifically, the average grain size of the second ceramic powder may be 1.1~1.4 times the average grain size of the first ceramic powder.

Also, a grain diameter in an active area with respect to a grain diameter in a cover area after sintering may be controlled to be within a range of 1.1~4.4. The grain diameters of the first and second ceramic powders after sintering may be enlarged as compared to the grain diameters of the first and second ceramic powders before sintering, but an enlarged ratio may not be largely changed, since the first and second ceramic powders are sintered simultaneously.

The first ceramic powder may be used to prepare a ceramic sheet for the cover area, and the second ceramic powder may be used to prepare a ceramic sheet for the active area.

The first ceramic powder is mixed with an organic solvent, a binder, and the like to prepare ceramic slurry through ball milling or the like, and then, the first ceramic green sheets may be manufactured using the ceramic slurry through a method such as a doctor blade method or the like.

The second ceramic green sheets may be formed of the second ceramic powder by using the above same method.

The first and second ceramic powders may include a barium titanate powder. Barium titanate has a high dielectric constant, and induces storage of charges, thereby allowing for high-capacitance capacitor implementation.

The internal electrodes may be formed by printing a conductive paste on each of the second ceramic green sheets, while the internal electrodes may not be formed on the first ceramic green sheets.

The conductive paste may include a conductive metal, and specifically, examples of the conductive metal may include at least one selected from the group consisting of nickel, palladium, and an alloy thereof.

Since gold, silver, platinum, palladium, and the like are expensive but stable, they may be sintered in air. However, since nickel, copper, and the like are cheap but oxidizable, they may need to be sintered in a reducing atmosphere.

Any conductive metal that may provide conductivity to the internal electrodes may be used, but the conductive metal is not limited thereto.

The upper cover and the lower cover may be formed by laminating the first ceramic green sheets. Considering sintering shrinkage, the upper cover and the lower cover may each have a thickness of 11~28 μm. Thus, the thickness of the cover area after sintering may be 9~25 μm.

A second ceramic green sheet laminate may be formed by laminating the second ceramic green sheets each having the internal electrodes formed thereon. The number of laminated internal electrodes is may be 250 or greater, thereby implementing high-capacitance. The second ceramic green sheet laminate may constitute an active area later.

The lower cover, the second ceramic green sheet laminate, and the upper cover are laminated to form a final green laminate.

The multilayer ceramic electronic component may be manufactured by preparing a sintered chip through cutting, firing, and sintering processes of the green laminate, forming the external electrodes on outer surfaces of the sintered chip through a dipping method using a conductive paste, and then performing baking thereon.

Hereinafter, the present invention will be described in detail, with reference to inventive examples and comparative examples.

A multilayer ceramic capacitor according to the each of the inventive examples was manufactured as follows.

First, in order to diversify the grain size in the active area, a barium titanate powder having an average grain size in the range of 0.05~3 μm was appropriately selected and used.

The ceramic slurry was prepared by mixing ethanol as an organic solvent and polyvinyl butyral as a binder into the barium titanate powder, and then ball milling the mixture. The ceramic slurry was used to form ceramic green sheets for an active area.

Also, in order to diversify the grain size in the cover area, a barium titanate powder having an average grain size in the range of 0.05~3 μm was appropriately selected and used, to form ceramic green sheets for cover areas.

Next, the internal electrodes were printed on each of ceramic green sheets for an active area using a conductive paste including a nickel metal.

Next, 3 to 8 ceramic green sheets for an upper cover area, 250 ceramic green sheets for an active area, and 3 to 8 ceramic green sheets for a lower cover area were sequentially laminated to form a green laminate, and then the green laminate was subjected to isostatic pressing at a temperature of 85° C. under a pressure of 1000 kgf/cm².

The pressed green laminate was cut into separate chips, and the cut chips were de-bound by being maintained at a temperature of 230° C. and in an air atmosphere for 60 hours. After that, the chips were fired under an oxygen partial pressure of $10^{-11}$ ~$10^{-10}$ atm, lower than Ni/NiO equilibrium oxygen partial pressure, so that the internal electrodes were not oxidized at a temperature of 950~1200° C.

After polishing external surfaces of the fired chip, the fired chip was dipped in a conductive paste for an external electrode, followed by baking, thereby forming external electrodes. The conductive paste for an external electrode was prepared by adding glass, binders, and the like into a copper powder. A tin plating layer was formed on surfaces of the external electrodes through electroplating.

Each of multilayer ceramic electronic components, that is, multilayer ceramic capacitor according to the comparative examples was manufactured by the same method as the cases of the inventive examples; however, the thickness ($T_c$) of the cover area thereof was differentiated therefrom, and the average grain sizes of the barium titanate powder used in the respective cover area and the active area were differentiated therefrom.

A moisture resistance load test was performed on each of the ceramic capacitors manufactured by the above method, and insulation resistance (IR) was measured after and before the moisture resistance load test, so that reliability thereof was evaluated.

In the moisture resistance load test, a rated voltage of 1.5 Vr was applied under a temperature of 40±2° C. and humidity of 90~95% RH for 500(+12/−0)hr, and a charging/discharging current was set to 50 mA or less.

The IR was measured after thermal treatment for 1 hour at a temperature of 150° C.(+0/−10)° C. before and after the moisture resistance load test, and standing at a room temperature for 24(±2) hours.

Considering product standards, products having IR of 50 MΩ or higher before the moisture resistance load test and IR of 3.5 MΩ or higher after the moisture resistance load test were determined to be good.

A cross-section of a sample, which has been subjected to the moisture resistance load test and polishing, was photographed by SEM, and based on this, the thickness ($T_c$) of the cover area, and the diameters ($D_c$, and $D_a$) of ceramic grains in the cover area and the active area were measured.

Tables 1 to 5 show results of cases in which the thickness ($T_c$) of the cover area has 6 μm, 9 μm, 15 μm, 25 μm, and 35 μm, respectively.

TABLE 1

| | | | | | | IR (MΩ) | | |
| --- | --- | --- | --- | --- | --- | --- | --- | --- |
| | $T_c$ (um) | $D_c$ (nm) | $T_c/D_c$ | $D_a$ (nm) | $D_a/D_c$ | Before moisture resistance load test | After moisture resistance load test | Determination |
| Comparative example 1 | 6 | 60 | 100 | 66 | 1.1 | 23 | 1.2 | Defective |
| Comparative example 2 | 6 | 109 | 55 | 218 | 2.0 | 32 | 0.6 | Defective |
| Comparative example 3 | 6 | 120 | 50 | 528 | 4.4 | 26 | 1.7 | Defective |

TABLE 2

| | | | | | | IR (MΩ) | | |
| --- | --- | --- | --- | --- | --- | --- | --- | --- |
| | $T_c$ (um) | $D_c$ (nm) | $T_c/D_c$ | $D_a$ (nm) | $D_a/D_c$ | Before moisture resistance load test | After moisture resistance load test | Determination |
| Comparative example 4 | 9 | 90 | 100 | 81 | 1.0 | 42 | 1.8 | Defective |
| Inventive example 1 | 9 | 90 | 100 | 99 | 1.1 | 59 | 4.8 | Good |
| Inventive example 2 | 9 | 90 | 100 | 180 | 2.0 | 72 | 15 | Good |
| Inventive example 3 | 9 | 90 | 100 | 396 | 4.4 | 64 | 9.0 | Good |
| Comparative example 5 | 9 | 90 | 100 | 414 | 4.6 | 36 | 2.1 | Defective |
| Comparative example 6 | 9 | 164 | 55 | 147 | 1.0 | 42 | 1.8 | Defective |
| Inventive example 4 | 9 | 164 | 55 | 180 | 1.1 | 58 | 8.4 | Good |
| Inventive example 5 | 9 | 164 | 55 | 327 | 2.0 | 69 | 7.8 | Good |
| Inventive example 6 | 9 | 164 | 55 | 720 | 4.4 | 62 | 10 | Good |
| Comparative example 7 | 9 | 164 | 55 | 753 | 4.6 | 48 | 1.7 | Defective |
| Comparative example 8 | 9 | 180 | 50 | 162 | 1.0 | 25 | 3.2 | Defective |
| Comparative example 9 | 9 | 180 | 50 | 198 | 1.1 | 38 | 3.4 | Defective |

TABLE 2-continued

|  | $T_c$ (um) | $D_c$ (nm) | $T_c/D_c$ | $D_a$ (nm) | $D_a/D_c$ | IR (MΩ) Before moisture resistance load test | IR (MΩ) After moisture resistance load test | Determination |
|---|---|---|---|---|---|---|---|---|
| Comparative example 10 | 9 | 180 | 50 | 360 | 2.0 | 36 | 3.2 | Defective |
| Comparative example 11 | 9 | 180 | 50 | 792 | 4.4 | 32 | 2.0 | Defective |
| Comparative example 12 | 9 | 180 | 50 | 828 | 4.6 | 48 | 2.4 | Defective |

TABLE 3

|  | $T_c$ (um) | $D_c$ (nm) | $T_c/D_c$ | $D_a$ (nm) | $D_a/D_c$ | IR (MΩ) Before moisture resistance load test | IR (MΩ) After moisture resistance load test | Determination |
|---|---|---|---|---|---|---|---|---|
| Comparative example 13 | 15 | 150 | 100 | 135 | 1.0 | 28 | 3.6 | Defective |
| Inventive example 7 | 15 | 150 | 100 | 165 | 1.1 | 53 | 4.6 | Good |
| Inventive example 8 | 15 | 150 | 100 | 300 | 2.0 | 72 | 6.5 | Good |
| Inventive example 9 | 15 | 150 | 100 | 660 | 4.4 | 64 | 6.8 | Good |
| Comparative example 14 | 15 | 150 | 100 | 690 | 4.6 | 32 | 0.8 | Defective |
| Comparative example 15 | 15 | 273 | 55 | 246 | 1.0 | 42 | 1.3 | Defective |
| Inventive example 10 | 15 | 273 | 55 | 300 | 1.1 | 59 | 5.8 | Good |
| Inventive example 11 | 15 | 273 | 55 | 546 | 2.0 | 79 | 9.2 | Good |
| Inventive example 12 | 15 | 273 | 55 | 1200 | 4.4 | 75 | 9.0 | Good |
| Comparative example 16 | 15 | 273 | 55 | 1255 | 4.6 | 53 | 2.1 | Defective |
| Comparative example 17 | 15 | 300 | 50 | 270 | 1.0 | 51 | 1.7 | Defective |
| Comparative example 18 | 15 | 300 | 50 | 330 | 1.1 | 23 | 0.6 | Defective |
| Comparative example 19 | 15 | 300 | 50 | 600 | 2.0 | 32 | 1.4 | Defective |
| Comparative example 20 | 15 | 300 | 50 | 1320 | 4.4 | 33 | 2.9 | Defective |
| Comparative example 21 | 15 | 300 | 50 | 1380 | 4.6 | 40 | 2.1 | Defective |

TABLE 4

|  | $T_c$ (um) | $D_c$ (nm) | $T_c/D_c$ | $D_a$ (nm) | $D_a/D_c$ | IR (MΩ) Before moisture resistance load test | IR (MΩ) After moisture resistance load test | Determination |
|---|---|---|---|---|---|---|---|---|
| Comparative example 22 | 25 | 250 | 100 | 225 | 1.0 | 62 | 3.2 | Defective |
| Inventive example 13 | 25 | 250 | 100 | 275 | 1.1 | 78 | 7.8 | Good |
| Inventive example 14 | 25 | 250 | 100 | 500 | 2.0 | 53 | 3.6 | Good |
| Inventive example 15 | 25 | 250 | 100 | 1100 | 4.4 | 68 | 6.2 | Good |

TABLE 4-continued

| | $T_c$ (um) | $D_c$ (nm) | $T_c/D_c$ | $D_a$ (nm) | $D_a/D_c$ | IR (MΩ) Before moisture resistance load test | IR (MΩ) After moisture resistance load test | Determination |
|---|---|---|---|---|---|---|---|---|
| Comparative example 23 | 25 | 250 | 100 | 1150 | 4.6 | 48 | 2.3 | Defective |
| Comparative example 24 | 25 | 455 | 55 | 409 | 1.0 | 52 | 1.4 | Defective |
| Inventive example 16 | 25 | 455 | 55 | 500 | 1.1 | 72 | 7.9 | Good |
| Inventive example 17 | 25 | 455 | 55 | 909 | 2.0 | 70 | 6.4 | Good |
| Inventive example 18 | 25 | 455 | 55 | 2000 | 4.4 | 81 | 7.9 | Good |
| Comparative example 25 | 25 | 455 | 55 | 2091 | 4.6 | 32 | 2.1 | Defective |
| Comparative example 26 | 25 | 500 | 50 | 450 | 1.0 | 42 | 2.0 | Defective |
| Comparative example 27 | 25 | 500 | 50 | 550 | 1.1 | 39 | 2.1 | Defective |
| Comparative example 28 | 25 | 500 | 50 | 1000 | 2.0 | 32 | 0 | Defective |
| Comparative example 29 | 25 | 500 | 50 | 2200 | 4.4 | 42 | 1.7 | Defective |
| Comparative example 30 | 25 | 500 | 50 | 2300 | 4.6 | 27 | 0.4 | Defective |

TABLE 5

| | $T_c$ (um) | $D_c$ (nm) | $T_c/D_c$ | $D_a$ (nm) | $D_a/D_c$ | IR (MΩ) Before moisture resistance load test | IR (MΩ) After moisture resistance load test | Determination |
|---|---|---|---|---|---|---|---|---|
| Comparative example 31 | 35 | 636 | 55 | 573 | 1.0 | 67 | 8.3 | Good |
| Comparative example 32 | 35 | 636 | 55 | 700 | 1.1 | 72 | 7.2 | Good |
| Comparative example 33 | 35 | 636 | 55 | 1273 | 2.0 | 72 | 6.9 | Good |
| Comparative example 34 | 35 | 636 | 55 | 2800 | 4.4 | 64 | 7.0 | Good |
| Comparative example 35 | 35 | 636 | 55 | 2927 | 4.6 | 67 | 7.0 | Good |
| Comparative example 36 | 35 | 700 | 50 | 630 | 1.0 | 59 | 6.2 | Good |
| Comparative example 37 | 35 | 700 | 50 | 770 | 1.1 | 69 | 7.4 | Good |
| Comparative example 38 | 35 | 700 | 50 | 1400 | 2.0 | 74 | 8.0 | Good |
| Comparative example 39 | 35 | 700 | 50 | 3080 | 4.4 | 69 | 6.9 | Good |
| Comparative example 40 | 35 | 700 | 50 | 3220 | 4.6 | 75 | 7.5 | Good |

Table 1 shows reliability evaluation results on the multilayer ceramic capacitors each having a cover area with the thickness ($T_c$) of 6 μm.

Referring to Table 1, all of comparative examples 1 to 3 were indicated as being defective since IR values thereof did not meet the standard regardless of $T_c/D_c$ and $D_a/D_c$ values thereof. This is because that the cover area is extremely thin.

Table 2 shows reliability evaluation results on the multilayer ceramic capacitors each having a cover area with the thickness ($T_c$) of 9 μm.

Referring to FIG. 2, inventive examples 1 to 3, in which Tc values thereof were all 9 μm, $T_c/D_c$ values thereof were 100, and $D_a/D_c$ values thereof were 1.1, 2.0, and 4.4, respectively, were indicated as having good reliability. In conclusion, when the $D_a/D_c$ value is 1.1 to 1.4, moisture-resistance properties of the multilayer ceramic capacitor are good.

Inventive examples 4 to 6 showed similar results to inventive examples 1 to 3.

Comparative example 4, in which the Tc value thereof was 9 μm, the $T_c/D_c$ value thereof was 100, and the $D_a/D_c$ value thereof was 1.0, was indicated as having defects in reliability. This is because that an effect of reducing the non-uniform stress distribution due to a difference in sintering temperature between the cover area and the active area was slight since the grain size in the cover area is similar to the grain size in the active area.

Comparative example 6, in which the Tc value thereof was 9 μm, the $T_c/D_c$ value thereof was 164, and the $D_a/D_c$ value thereof was 1.0, was indicated as having the same result as that of Inventive example 4.

Comparative example 5, in which the Tc value thereof was 9 μm, the $T_c/D_c$ value thereof was 100, and the $D_a/D_c$ value thereof was 4.6, was indicated as having defects in reliability. This is because that the cover area was more quickly sintered than the active area since the grain size in the cover area was significantly smaller than the grain size in the active area, which may cause non-uniform inner stress distribution.

Comparative example 7, in which the Tc value thereof was 9 μm, the $T_c/D_c$ value thereof was 164, and the $D_a/D_c$ value thereof was 4.6, was indicated as having the same result as that of Inventive example 5.

Comparative examples 8 to 12, in which the Tc values thereof were all 9 μm, the $Tc/D_c$ values were all 50, and the $D_a/D_c$ values thereof were 0.9 to 4.6, was indicated as having defects in reliability. This is because that the $Tc/D_c$ value was small, 50, regardless of the $D_a/D_c$ values. In other words, it is assumed that the $Tc/D_c$ value may mean the average number of grains in the thickness, located in the cover area, a route for moisture infiltration may be shortened if the number of grains is smaller than 55.

Tables 3 and 4 show reliability evaluation results on the multilayer ceramic capacitors each having a cover area with a thickness ($T_c$) of 15 μm or 25 μm. It may be confirmed that Tables 3 and 4 show similar results to Table 2.

Table 5 shows reliability evaluation results on multilayer ceramic capacitors each having a cover area with a thickness ($T_c$) of 35 μm.

Referring to Table 5, Comparative examples 31 to 40 were indicated as being all good in moisture-resistance properties results, regardless of $Tc/D_c$ and $D_a/D_c$ values. The reason is that the thickness ($T_c$) of the cover area is sufficiently large.

The following conclusions may be obtained from the above experimental results.

First, if the thickness of the cover area is thicker than 25 μm, moisture-resistance properties of the multilayer ceramic electronic component, that is, the multilayer ceramic capacitor, is excellent.

Second, the moisture-resistance properties may be degraded due to non-uniformity in stress distribution, which is caused by a difference in sintering temperatures between the cover area and the active area when the thickness of the cover area becomes 25 μm or smaller.

However, the moisture-resistance properties can be improved, by allowing the grain size in the cover area to be smaller than the grain size in the active area ($1.1 \leq D_a/D_c \leq 4.4$) and controlling the number of grains in the cover area in the thickness direction ($T_c/D_c \geq 55$).

Third, when the thickness of the cover area is thinner than 9 μm, the moisture-resistance properties cannot be improved even though $D_a/D_c$ and $T_c/D_c$ values are controlled.

According to the present invention, a multilayer ceramic electronic component having excellent moisture-resistance properties and a method of manufacturing the same can be obtained.

Terms used in the present specification for explaining specific embodiments have been disclosed for illustrative purposes, and they are for specifically explaining the present invention. Singular forms are intended to include plural forms, unless the context clearly indicates otherwise.

The terms "comprise" and/or "comprising" will be understood to imply the inclusion of stated constituents, steps, operations and/or elements but not the exclusion of any other constituents, steps, operations and/or elements.

The present invention is not limited to the above-mentioned embodiments and the accompanying drawings but is defined by the accompanying claims.

Accordingly, various forms of substitutions, modifications and alterations may be made by those skilled in the art without departing from the spirit of the prevent invention defined by the accompanying claims. These substitutions, modifications and alterations are considered as being within the scope of the present invention.

What is claimed is:

1. A multilayer ceramic electronic component, comprising:
   a ceramic body;
   external electrodes formed on outer surfaces of the ceramic body; and
   internal electrodes laminated with ceramic layers each interposed therebetween in the ceramic body,
   wherein the ceramic layers comprise first ceramic grains having a first average diameter ($D_a$) and the first ceramic grains are in direct physical contact with facing sides of adjacent internal electrodes,
   the ceramic body includes an active area from an uppermost internal electrode to a lowermost internal electrode and a cover area formed above or below the active area,
   the cover area comprises second ceramic grains having a second average diameter ($D_c$),
   the average diameter ($D_c$) of the second ceramic grains in the cover area formed above or below the active area is smaller than the average diameter ($D_a$) of the first ceramic grains in the active area, and
   when a thickness of he cover area is expressed by $T_c$, 9 um$\leq T_c \leq$25 um and $T_c/D_c \geq$55 are satisfied.

2. The multilayer ceramic electronic component of claim 1, wherein the average diameter ($D_c$) of ceramic grains in the cover area is an average diameter of the ceramic grains in the cover area in a thickness direction of the ceramic body.

3. The multilayer ceramic electronic component of claim 1, wherein $1.1 \leq D_a/D_c \leq 4.4$ is satisfied.

4. The multilayer ceramic electronic component of claim 1, wherein the ceramic body includes a dielectric material.

5. The multilayer ceramic electronic component of claim 4, wherein the dielectric material includes barium titanate or strontium titanate.

6. The multilayer ceramic electronic component of claim 1, wherein the number of the internal electrodes laminated in the ceramic body is 250 or greater.

7. The multilayer ceramic electronic component of claim 1, wherein the internal electrodes include at least one selected from a group consisting of nickel, palladium, and an alloy thereof.

8. The multilayer ceramic electronic component of claim 1, wherein the external electrodes include at least one selected from a group consisting of nickel, nickel alloys, and palladium.

9. A multilayer ceramic electronic component, comprising:
   a ceramic body including an internal electrode lamination part having a plurality of internal electrodes laminated therein,
   wherein the internal electrode lamination part comprises first ceramic grains having a first average diameter ($D_a$) and the first ceramic grains are in direct physical contact with facing sides of adjacent internal electrodes;

an outer area outside the internal electrode lamination part comprising second ceramic grains having a second average diameter ($D_c$); and external electrodes formed on outer surfaces of the ceramic body, wherein a thickness ($T_c$) of an outer area outside the internal electrode lamination part of the ceramic body is 9~25 μm, the average diameter ($D_c$) of second ceramic grains in the outer area is smaller than the average diameter ($D_a$) of first ceramic grains in the internal electrode lamination part of the ceramic body, and $T_c/D_c \geq 55$ is satisfied.

10. The multilayer ceramic electronic component of claim 9, wherein in the internal electrode lamination part, adjacent internal electrodes among the plurality of internal electrodes are withdrawn in opposing directions.

11. The multilayer ceramic electronic component of claim 9, wherein the outer area is disposed in a lamination direction of the internal electrodes in the internal electrode lamination part.

12. The multilayer ceramic electronic component of claim 9, wherein the average diameter ($D_c$) of ceramic grains in the outer area is an average diameter of the ceramic grains in the outer area in a thickness direction of the ceramic body.

13. The multilayer ceramic electronic component of claim 9, wherein $1.1 \leq D_a/D_c \leq 4.4$ is satisfied.

14. The multilayer ceramic electronic component of claim 9, wherein the ceramic body includes a dielectric material.

15. The multilayer ceramic electronic component of claim 14, wherein the dielectric material includes barium titanate or strontium titanate.

16. The multilayer ceramic electronic component of claim 9, wherein the number of the internal electrodes laminated in the ceramic body is 250 or greater.

17. The multilayer ceramic electronic component of claim 9, wherein the internal electrodes include at least one selected from a group consisting of nickel, palladium, and an alloy thereof.

18. The multilayer ceramic electronic component of claim 9, wherein the external electrodes include at least one selected from a group consisting of nickel, nickel alloys, and palladium.

19. A method of manufacturing a multilayer ceramic electronic component, the method comprising:
    preparing a first ceramic powder and a second ceramic powder, an average grain size of the second ceramic powder being 1.1~1.4 times an average grain size of the first ceramic powder;
    preparing first ceramic green sheets and second ceramic green sheets by using the first ceramic powder and the second ceramic powder, respectively;
    forming internal electrodes on each of the second ceramic green sheets;
    laminating the first ceramic green sheets to form an upper cover and a lower cover each having a thickness of 11~28 μm;
    laminating the desired number of the second ceramic green sheets each having the internal electrodes laminated thereon, to thereby form a second ceramic green sheet laminate,
    wherein the grains of the second ceramic powder are in direct physical contact with facing sides of adjacent internal electrodes; and
    laminating the lower cover, the second ceramic green sheet aminate, and the upper cover.

20. The method of claim 19, wherein in the preparing of the first ceramic powder and the second ceramic powder, the first ceramic powder and the second ceramic powder each includes a barium titanate powder.

21. The method of claim 19, wherein in the forming of the internal electrodes, the internal electrodes are formed through printing of a conductive paste.

22. The method of claim 21, wherein the conductive paste includes a conductive metal.

23. The method of claim 22, wherein the conductive metal includes at least one selected from a group consisting of nickel, palladium, and an alloy thereof.

* * * * *